United States Patent
Lukes et al.

[15] 3,674,881
[45] July 4, 1972

[54] INTEGRATED PROCESS FOR THE PRODUCTION OF CHLORINATED HYDROCARBONS

[72] Inventors: James J. Lukes, Cleveland; Robert J. Koll, Mayfield Village, both of Ohio

[73] Assignee: Diamond Shamrock Corporation, Cleveland, Ohio

[22] Filed: Dec. 15, 1969

[21] Appl. No.: 885,183

[52] U.S. Cl. ..........................260/65.4 H, 23/260
[51] Int. Cl. .......................................C07c 21/00
[58] Field of Search ..............................260/654 H Primary Examiner—Leon Zitver
Assistant Examiner—A. Siegel
Attorney—Roy Davis, C. Thomas Cross, Timothy E. Tinkler, John J. Freer, Sam E. Laub, Neal T. Levin, Leslie G. Nunn, Jr., Helen P. Brush and John C. Tiernan

[57] ABSTRACT

The process involves the preparation of trichloroethylene and perchlorethylene in separate production trains the operation of which, however, is integrated with respect to the recycle of certain organic streams for the purpose of improving product purity and simplifying separation procedures.

4 Claims, 3 Drawing Figures

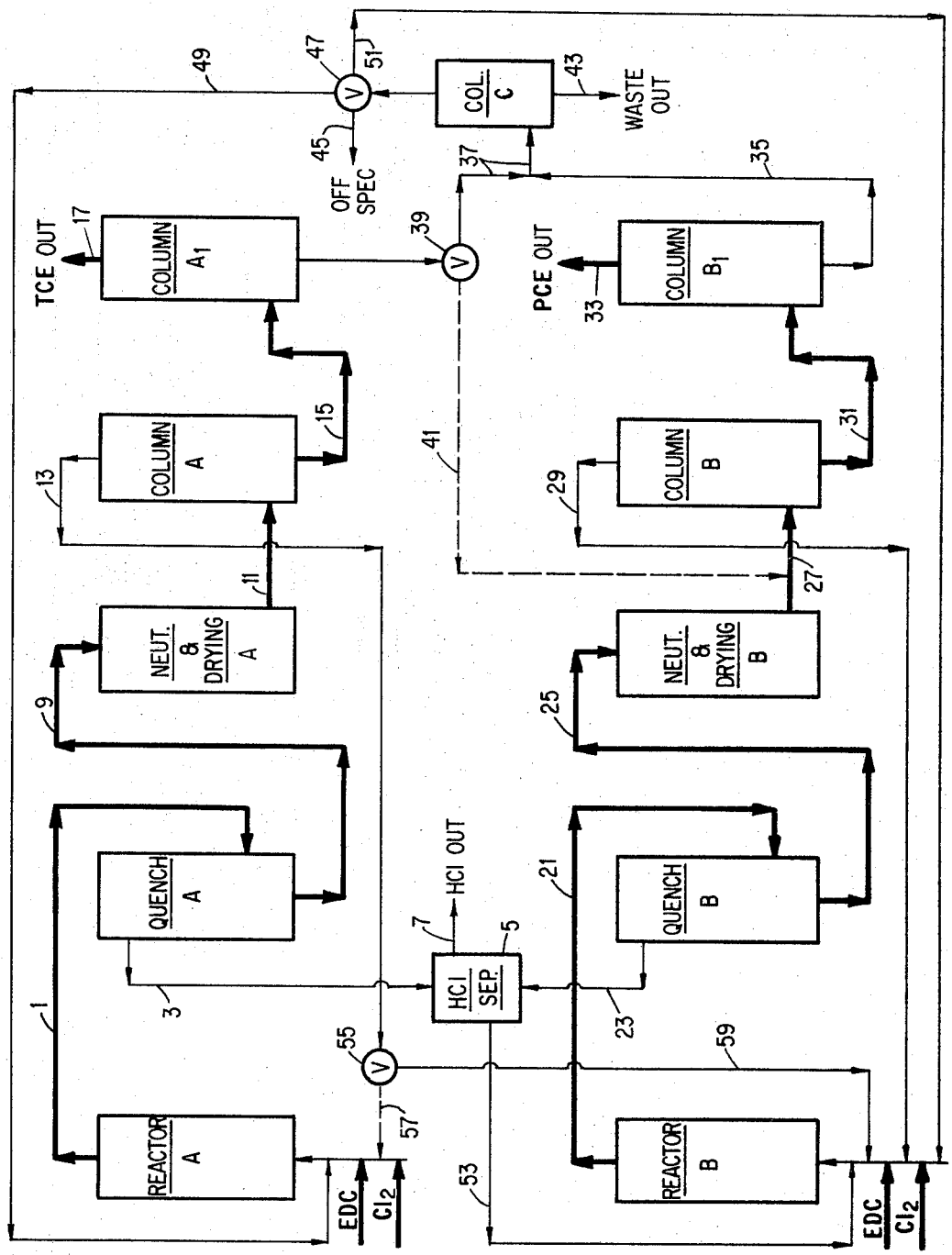

INTEGRATED PROCESS FOR THE PRODUCTION OF CHLORINATED HYDROCARBONS

BACKGROUND OF THE INVENTION

It is known to produce perchlorethylene by the vapor phase reaction, in a fluidized bed, of chlorine ($Cl_2$) and ethylene dichloride (EDC) at temperatures within the range of 380°–550° C., usually at substantially atmospheric pressures. If the mole ratio of $Cl_2$ to EDC is maintained at a perchlorination ratio, i.e., 3:1, the net reactor production will consist primarily of PCE, contaminated with a small amount in higher and lower boiling chlorinated materials, both saturated and unsaturated together with large quantities of anhydrous hydrogen chloride (HCl). The product gases are then quenched, the HCl together with a small amount of low boiling chlorinated hydrocarbons (light ends) remaining in the vapor phase, this vapor phase then being separated from the liquid phase which is predominantly chlorinated hydrocarbons, especially PCE. The liquid phase is neutralized to remove the last traces of HCl and, if necessary, dried, prior to rectification to yield a PCE product of a high degree of purity. Ordinarily this separation is effected by fractional distillation in three columns. In the first column the light ends are removed as the overheads while the predominant portion of the PCE is removed as bottoms together with the higher boiling chlorinated hydrocarbons, i.e., the heavy ends. These bottoms are passed to the second column wherein the purified PCE product is removed as the overhead, the bottoms, consisting of a small amount of PCE together with the heavy ends, being passed to a heavy ends stripper for further distillation. The overheads from this stripper are removed from the system as off-specification grade PCE, or recycled through the reactor as a coolant. In addition to this coolant recycle, the light ends from the first fractionating column, as well as the very light ends removed from the HCl during its further treatment and purification, are recycled to the reactor for further chlorination and conversion to the desired PCE product.

As a modification of the above practice, it is further known that by reducing the mole ratio of $Cl_2$ to EDC fed to the reactor, a product containing an increased amount of light ends, particularly TCE, is produced. This practice has been followed in recent years as the demand for TCE has increased as its commercial significance becomes recognized. Obviously much the same mechanical system as above can be employed, the only modification being that additional fractionation columns are required in order to separate the TCE from the light ends and from the PCE which is a heavy end with respect to the TCE. In such a modification of the process, essentially the same recycle of the various organic streams is used with the exception, of course, that the trichloroethylene previously recycled with the light ends for further chlorination to perchlorethylene, is now removed as a product.

In an attempt to operate the process so that both TCE and PCE are produced in the same production train, several problems have developed which affect both the purity of the end products and the overall efficiency of the process. For example, it has been found that contamination of the TCE (boiling point 86.7° C.) with carbon tetrachloride ($CCl_4$, b.p. 76.7° C.) can be a problem when the system is operated at certain $Cl_2$:EDC ratios. Thus, while operation at a $Cl_2$:EDC mole ratio of 2:1 does not usually lead to any problem of contamination of the TCE with $CCl_4$, as the ratio is increased toward the perchlorination ratio, thereby increasing the PCE:TCE ratio; increasing quantities of $CCl_4$ also appear in the finished TCE. Obviously then, the flexibility of the plant is severely restricted as to the quantities of high purity TCE and PCE which may be produced in response to changing commercial demand. Since the capital investment in a chlorinated solvents plants is relatively high, a process which would allow flexibility as to the relative product distribution would be highly desirable.

STATEMENT OF THE INVENTION

Therefore it is an object of the present invention to provide a process for the production of perchlorethylene and trichloroethylene which allows a wide range of choice as to product distribution without a resultant impairment in either the product purity or the process efficiency.

It is a further object of the present invention to provide an integrated process for the operation of separate trichloroethylene and perchlorethylene reactors and production trains which allows flexibility with respect to product distribution with a minimum of capital investment.

These and further objects of the present invention will become apparent to those skilled in the art from the description and claims which follow.

A process has now been found for the operation, on an integrated basis, of substantially separate trichlorethylene and perchlorethylene production trains, which process allows a wide range of choice with respect to the relative quantities of PCE and TCE produced, while still providing for the maintenance of a high level of product purity. This result is obtained by interconnecting the separate production trains with respect to certain organic streams, thereby allowing the use of the PCE train to destroy contaminants from the TCE train, without detriment to the PCE product, and further allowing the joint use of certain equipment by the separate production trains, hence resulting in a savings in capital outlay, while still increasing efficiency and decreasing contamination with respect to overall operation.

Specifically, an improved, integrated, process has now been found for the production of TCE and PCE by the vapor phase reaction of $Cl_2$ and EDC in a fluidized bed at a temperature of from 380° to 550° C. and at substantially atmospheric temperatures. This improved process involves: (1) the use of separate TCE and PCE production trains, each train comprising a fluid bed reactor, a quench system, neutralization and drying means and at least two fractionation columns and; (2) the TCE reactor being fed $Cl_2$ and EDC in a molar ratio of from 1.9:1–2.5:1 whereby the net reactor production consists essentially of from 70–10 percent TCE and 30–90 percent PCE, and the PCE reactor being fed $Cl_2$ and EDC in a molar ratio whereby the net reactor production consists essentially of PCE and (3) the improvement which comprises diverting at least a portion of the overheads from the first TCE fractionation column to the PCE reactor whereby the $CCl_4$ content of the TCE product is reduced. Another feature of the process comprises combining the light ends-containing HCl from the quench system of both the TCE and PCE trains, separating said light ends from said HCl and recycling said light ends to the PCE reactor. A further feature of the process comprising using at least one common fractionation column which receives the bottoms from the last PCE fractionation column and at least a portion of the bottoms from the last TCE fractionation column and using at least a portion of the overheads from said common fractionation column as the cooling recycle for both the TCE and PCE reactors. A still further feature of the process comprises the introduction of at least a portion of the bottoms from the last TCE fractionation column to the first PCE fractionation column.

BRIEF DESCRIPTION OF THE DRAWINGS

In order to facilitate an understanding of the invention reference will be made to the attached FIGS. 1–3 which are schematic representations of the integrated process for the production of trichloroethylene and perchlorethylene according to the present invention.

DESCRIPTION OF THE PREFERRED EMBODIMENTS

Figure 1:
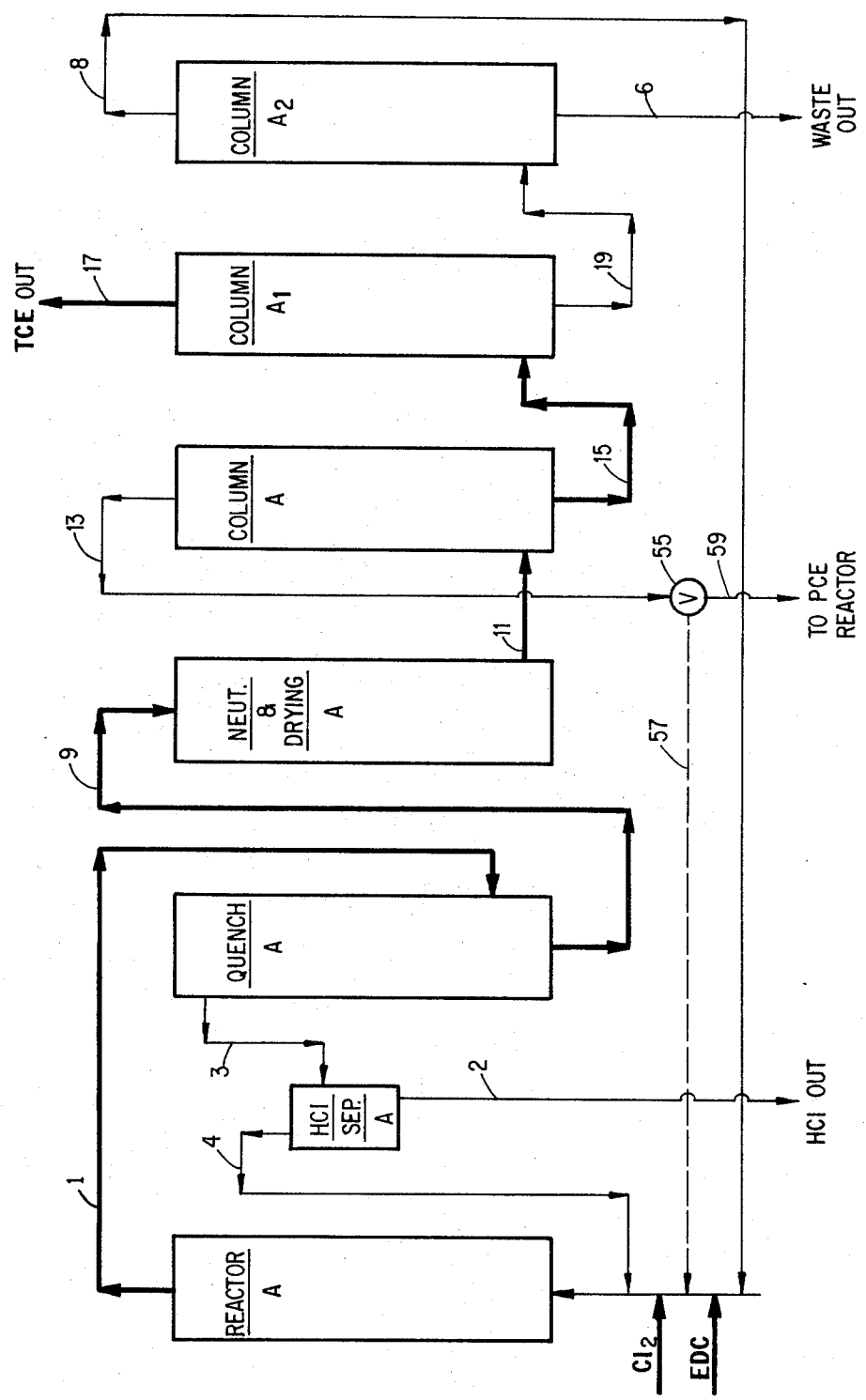

By the term "net reactor production" as used in the specification and claims it is intended to refer to the products removed from the trains, that is, TCE and PCE, exclusive of HCl, light ends and heavy ends.

It is believed that the invention will best be understood by first providing a brief description of the purpose and function of each stage of the production train, although it should be understood that the invention relates more to the integrated operation of separate production trains functioning at different feed ratios, than to the individual operation of any particular stage of the production train. It should further be understood that the function of the individual stages of each production train is for the most part the same, although the sizes of the units may vary depending upon the TCE versus PCE production demands of the plant.

The reactors are, in general, of the fluidized bed type and are usually provided with cooling means owing to the exothermic nature of the reaction. A substantially inert fluid bed medium is generally employed, for example, a spent aluminasilica hydrocarbon cracking catalyst.

The reaction gases are passed to the anhydrous quench system wherein the bulk of the chlorinated hydrocarbons are liquified, the anhydrous HCl and a small quantity of light ends remaining in the vapor phase. This vapor phase is then removed from the quench tower and the light ends are separated from the HCl, usually by refrigeration, and recycled for further chlorination to the reactor.

The chlorinated hydrocarbon stream is next removed to the neutralization and drying means wherein any HCl remaining in the solvent is neutralized, usually by treatment with an aqueous alkali. If an aquious neutralization is employed, the organic and aqueous phases are subjected to mechanical separation following which the organic phase is aqueous dried, e.g., by distillation, ion-exchange or the like.

The chlorinated solvent stream is then ready for rectification to obtain the final desired product. This is usually accomplished in two stages. In the first stage that portion of the hydrocarbons boiling at a lower temperature than the desired product is removed as overheads. The bottoms, containing the desired product, are then passed to a second column where the product is removed as an overhead and the bottoms, or heavy ends, are passed to a further stage for the recovery of any useful chlorinated materials.

This final separation stage serves to recover those chlorinated hydrocarbons of a sufficiently low boiling point to be useful either per se or as a cooling recycle to the reactors. The bottoms from this final column, consisting of heavy ends, tars and carbon, are usually discarded.

It will be understood that the sizes of the various components of the production trains will be dictated primarily by the demands imposed thereon by both the total production capacity of the plant and the relative quantities of TCE and PEC desired. It should further be understood that each production train may in fact employ more than one reactor operating at the same or somewhat different $Cl_2$:EDC feed ratio and that these reactors may employ common equipment within the production train, for example, the products of two or more reactors may be passed to common fractional distillation columns, provided of course, that the capacity of the columns is sufficient to meet the demands imposed thereon.

Figure 2:
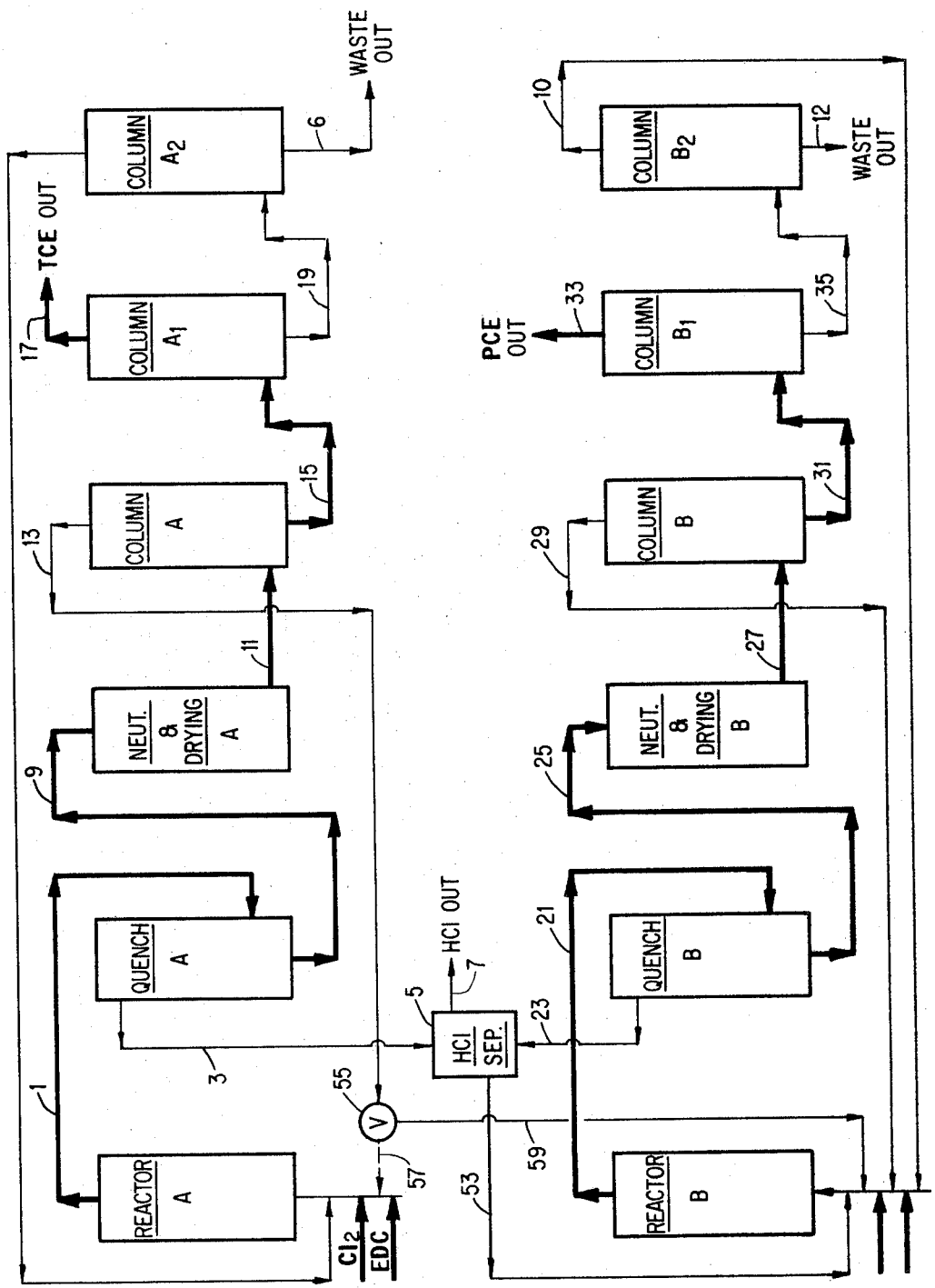

In order to more fully understand the present invention, reference is now made to the attached FIGS. 1-3 in which separate elements of the TCE production train are represented by the letter "A," elements of the PCE production train being represented by the letter "B." Column C for the separation and recovery of heavy ends is common to both production trains in FIG. 3, columns $A_2$ and $B_2$ not being required.

Referring to FIG. 1, in operation $Cl_2$ and EDC are fed to reactor A at less than a perchlorination ratio wherein the desired reaction takes place. The product gases including chlorinated hydrocarbons and anhydrous HCl leave reactor A via line 1 and are introduced into quench system A. From quench system A, HCl together with certain of the light ends are removed in the vapor phase via line 3 to HCl separator A. Purified anhydrous HCl is removed from the system via line 2 while the light ends separated therefrom, in the interest of economic operation, are recycled for further chlorination via line 4 to reactor A. Meanwhile, the now liquid chlorinated hydrocarbons are removed from the quench system A via line 9 and introduced into neutralization and drying means A. After treatment therein, the liquid solvent is led via line 11 into column A wherein all light ends, together with a small amount of TCE, are removed as overheads via line 13, the majority of the TCE together with any heavy ends being introduced via line 15 to column $A_1$.

Prior to the present invention the only economical disposition of the overheads removed from column A via line 13 has been a complete recycle to reactor A for further chlorination. When the reactor is operated at $Cl_2$:EDC feed ratios on the order of 2:1, hence producing a net reactor production of approximately 65 percent TCE and 35 percent PCE, the impurities present in the gases exiting from the reactor have contained only insignificant quantities of $CCl_4$ and hence rectification of the TCE product and the $CCl_4$ has not been difficult. However, if it is desired to vary the net reactor production with respect to the proportions of TCE and PCE, this is generally accomplished by increasing the $Cl_2$:EDC ratio. As this occurs it is found that $CCl_4$ exists in increasing quantities in the product gases from the reactor and with this increase in $CCl_4$ the problem of rectifying the TCE product becomes exceedingly difficult. For this reason operation heretofore has been limited to certain TCE:PCE ratios and, in the event of even a momentary upset in their feed ratio to the reactors, $CCl_4$ has been produced thereby contaminating the desired product. By the provision of the integrated process of the present invention however, greater flexibility is afforded since, in the event of an increase in the $CCl_4$ content of the overheads from column A in line 13, a method of disposal of this stream is provided, therefore ensuring a pure TCE product in line 17.

Thus, at least a portion of the overheads in line 13 is diverted through valve 55 into line 59 which carries these overheads to the PCE reactor (not shown in FIG. 1). A portion of these overheads may still be recycled through line 57 to reactor A if desired. The introduction of this $CCl_4$-contaminated stream into the PCE reactor presents no problem since the separation of $CCl_4$ from PCE in the fractionation columns is quite simple owing to the disparity in their boiling points. Also it will be found that the $CCl_4$ concentration in the product gases from the PCE reactor will soon reach an equilibrium, any excess over this equilibrium apparently being converted in the reactor to PCE. Hence, $CCl_4$ is no problem.

The overheads from column A having been disposed of in the manner described above, the bottoms from this column are passed via line 15 to column $A_1$. The overheads from column $A_1$ consist of high purity trichloroethylene and may be removed from the system via line 17. The bottoms from this column, primarily PCE and other heavy ends together with a small amount of TCE, are then removed via line 19 for further treatment in column $A_2$, which column serves to separate the useful heavy ends from the tars, carbon, etc. These very heavy ends are removed as bottoms from column $A_2$ via line 6 to waste disposal means. The overheads from column $A_2$ generally serve as a cooling recycle for reactor A, via line 8 but may be held for storage and sale.

Referring now to FIG. 2 it will be seen that the operation of the TCE reactor train is substantially the same as in FIG. 1 with the exception of the manner of disposition of the light ends-containing anhydrous HCl stream exiting quench system A via line 3. The operation of the PCE production train portion of the integrated system is described as follows. Chlorine and EDC are introduced into reactor B at substantially a perchlorination ratio, generally 3:1 but owing to certain practical considerations the feed ratio may be as high as 3.8:1. In this manner the gases from the reactor, consisting primarily of PCE and HCl together with some chlorinated hydrocarbon impurities, pass via line 21 into quench system B wherein they are separated into a vapor phase, consisting of anhydrous HCl and light ends, which is removed via line 23 and a liquid phase which passes via line 25 into neutralization and drying means B. After treatment in neutralization and drying means B, the chlorinated solvent is introduced via line 27 into distillation column B. The overheads from this column, containing all of the light ends together with a small portion of PCE, are recycled for further reaction and for cooling purposes to reactor B via line 29. The bottoms from column B are passed via line 31 to column $B_1$ wherein the PCE product is removed via line 33 from the system. The bottoms from this column, which still contain a small quantity of PCE, are removed via line 35 for further treatment in column $B_2$. In column $B_2$ the remaining useful chlorinated hydrocarbons are separated and removed as overheads via line 10 for recycle to reactor B. Meanwhile the extremely heavy ends are removed as bottoms via line 12, generally to be discarded.

The integrating feature of FIG. 2, in addition to the diversion of a portion of the overheads from column A via lines 13 and 59 to reactor B, includes the joint operation of HCl separator 5. In FIG. 2 the light ends-containing anhydrous HCl from both quench systems A and B is introduced via lines 3 and 23, respectively, into common HCl separator 5. Therein the HCl is further purified and removed via line 7 from the system. It will be readily apparent that the use of a combined HCl separator will result in a considerable savings in capital investment and hence that such joint use is desirable. However, a problem arises in that considerable quantities of $CCl_4$ may be contained in the gaseous stream introduced via line 23 to common HCl separator 5, depending upon the efficiency of the operation of reactor B and the $Cl_2$:EDC feed ratio thereto. Since the function of the HCl separator is to provide purified anhydrous HCl for removal and sale via line 7, there remains after this separation a considerable quantity of light ends which, in the interest of economic operation, must be recycled to a reactor for further chlorination. However, since it has been mentioned that these light ends may contain considerable amounts of $CCl_4$ and since this contaminant cannot be tolerated to any great extent in the TCE production train if high purity TCE is to be obtained, it becomes apparent that the advantages of combined operation may not be realized unless an economic method of disposal of this gaseous stream is provided. The integrated operation of the present invention provides such a method owing to the fact that the light ends may be recycled via line 53 exclusively to reactor B, where $CCl_4$ presents no problem.

FIG. 3 illustrates the most preferred process for the integrated production of TCE and PCE. In this embodiment fractionation columns $A_2$ and $B_2$ shown in FIGS. 1 and 2 are replaced by common fractionation column C. The advantage of such an operation in terms of reduction in the amount of equipment required is obvious. It has further been found that the overheads from this common column C, which may be considered as a "heavy ends stripper" serve equally as well as cooling recycle for either reactor A or B. Optionally of course these overheads may be held in storage or for sale as an off-specification grade PCE.

In operation, the bottoms conveyed by line 35 from column $B_1$ are introduced into column C via line 37. The bottoms in line 19 from column $A_1$ however, while they eventually must pass through column C, may do so either directly or after passage through a portion of the PCE production train. This flexibility of operation is provided by means of valve 39 and line 41. It will be appreciated that the material in line 19 contains a significant quantity of PCE. For this reason it may be desired, rather than to directly introduce the materials of line 19 to line 37 and hence into column C, to divert at least a portion of the liquid in line 19 through valve 39 into line 41 and subsequently into column B of the PCE production train. In this manner the bottoms of column $A_1$ will mix with the crude PCE with the result that the PCE contained therein will be removed as a purified product from column $B_1$ via line 33 and the bottoms, together with the bottoms already present in the crude PCE stream, will enter column C via lines 35 and 37. While the bottoms from column C are generally removed via line 43 to a waste disposal means, the overheads, consisting primarily of PCE together with contaminating light and heavy ends, after passing through valve 47 may be directed either to an "off specification" tank (not shown) via line 45 for storage and sale or diverted to reactors A and B via lines 49 and 51, respectively, for use in cooling the exothermic reaction.

In general the process of the present invention provides a method for integrating the operation of separate TCE and PCE production trains in such a way that a contaminant with respect to a first production train may be "disposed of" at an economic advantage in a second production train, without detriment to the product of said second train. Furthermore, common use of certain of the equipment is permitted, again without detriment to either product.

The following example of an integrated operation is offered. A first reactor, part of the production train for manufacturing PCE, is fed $Cl_2$ a rate of 136 tons per day and EDC at a rate of 63 tons per day. Operation of this production train is integrated with the operation of a smaller second production train being fed 64 tons per day of $Cl_2$ and 45 tons per day of EDC, thereby resulting in the production of substantial quantities of TCE. In this manner the net first reactor production of PCE is 100 tons per day, while the net second reactor production is 30 tons per day of TCE and 20 tons per day of PCE. The PCE produced in the "TCE reactor" is eventually found in the PCE product of the PCE production train owing to the recycle, as shown in FIG. 3, of the bottoms from the last TCE distillation column ($A_1$) to the first PCE distillation column (B). In this manner an overall production rate of 120 tons per day of PCE containing less than 50 p.p.m. of $CCl_4$ and 100 p.p.m. TCE is produced together with 30 tons per day of TCE containing less than 50 p.p.m. of $CCl_4$ and 100 p.p.m. of PCE. The overall process, operated as described above and as illustrated in FIG. 3, is found to be simple, efficient and flexible.

While the invention has been described with reference to certain preferred embodiments thereof, it is not to be so limited since changes and alterations may be made which are within the full and intended scope of the appended claims.

We claim:

1. An integrated process for the production of trichloroethylene and perchloroethylene by the vapor phase, fluid bed reaction of chlorine and ethylene dichloride at temperatures of from 380°–550° C. and at substantially atmospheric pressures, which process consists essentially of:

A. in at least one separate trichloroethylene production train, feeding chlorine and ethylene dichloride in a molar ratio of from 1.9–2.5:1 to a fluid bed reactor, allowing the feed to react therein to a net reactor product consisting essentially of from 70–10 percent trichloroethylene and 30–90 percent perchloroethylene, quenching the reaction products, neutralizing and drying the quenched liquid reaction products and rectifying the reaction products in at least two fractionation columns, B. in at least one separate perchloroethylene production train, feeding chlorine and ethylene dichloride to a fluid bed reactor in a molar ratio sufficient that the net reactor production consists essentially of perchloroethylene, allowing the feed to react therein, quenching the reaction products neutralizing and drying the quenched liquid reaction products and rectifying the reaction products in at least two fractionation columns and C. diverting at least a portion of the overheads from the first trichloroethylene fractionation column of (A) to the perchloroethylene reactor of (B), whereby the carbon tetrachloride content of the trichloroethylene product of (A) is reduced.

2. A process as in claim 1 which comprises combining the light ends-containing HCl, which remains in the vapor phase after quenching the reaction products, of both the trichloroethylene and perchloroethylene production trains, separating said light ends from said HCl and recycling said light ends to the perchloroethylene reactor.

3. A process as in claim 1 which further comprises using at least one common fractionation column which receives the bottoms from the last perchloroethylene fractionation column and at least a portion of the bottoms from the last trichloroethylene fractionation column and using at least a portion of the overheads from said common fractionation column as the cooling recycle for both the trichloroethylene and perchloroethylene reactors.

4. A process as in claim 1 which further comprises the introduction of at least a portion of the bottoms from the last trichloroethylene fractionation column to the first perchloroethylene fractionation column.

* * * * *